United States Patent [19]
Gaalswyk

[11] Patent Number: 5,483,907
[45] Date of Patent: Jan. 16, 1996

[54] LOW FRICTION GAUGE WHEEL RIM LINER

[76] Inventor: Mark K. Gaalswyk, R.R. #1 Box 85, Welcome, Minn. 56181

[21] Appl. No.: 161,526

[22] Filed: Dec. 6, 1993

[51] Int. Cl.[6] ............................................ A01C 5/06
[52] U.S. Cl. ...................... 111/167; 111/163; 172/519; 301/37.43
[58] Field of Search ...................... 111/62, 134, 135, 111/157, 163, 164, 167; 172/747, 519; 301/37.1, 37.41, 37.37, 37.24, 37.42, 37.43; 280/160, 160.1

[56] References Cited

U.S. PATENT DOCUMENTS

| | | | |
|---|---|---|---|
| 652,481 | 6/1900 | Hyder | 301/37.37 |
| 882,933 | 3/1908 | Drake | 301/37.37 |
| 3,669,501 | 6/1972 | Derleth | 301/37 R |
| 4,760,806 | 8/1988 | Bigbee et al. | 111/87 |
| 4,823,884 | 4/1989 | McCall | 172/747 X |
| 4,986,200 | 1/1991 | Johnston | 111/135 |
| 5,368,370 | 11/1994 | Beam | 301/37.36 |

Primary Examiner—Terry Lee Melius
Assistant Examiner—Spencer Warnick
Attorney, Agent, or Firm—Henderson & Sturm

[57] ABSTRACT

A rim liner member attached to and covering the face of a gauge wheel rim adjacent a soil penetrating disk. The liner member has an exterior surface having a high lubricity which minimizes the build up of wet soil on the exterior surface. The entire liner member may be formed of low-friction polyethylene and it may be configured to conform to the face of the gauge wheel rims used by the manufacturers of planter, grain drills, and other soil working implements.

11 Claims, 1 Drawing Sheet

LOW FRICTION GAUGE WHEEL RIM LINER

TECHNICAL FIELD

This invention relates to soil working implements, and more particularly to a low-friction rim liner to minimize soil build-up on a depth gauge wheel.

BACKGROUND

In soil working implements, such as planters and grain drills, a depth gauge wheel is frequently closely positioned to a soil penetrating disk to control the depth of penetration. Also, due to the close positioning of the gauge wheel to the disk, the tread portion of the wheel acts as a scraper by contacting and removing soil buildup on the disk.

Under conditions where the soil has a high moisture content, the wet soil builds up on the face of the gauge wheel rim adjacent the disk until the unit becomes plugged with mud. The operator must then interrupt the planting operation and remove the mud with a putty knife or other suitable tool before resumption of planting. This results in inefficient operation since up to one-third of the operator's time may be spent cleaning mud from the gauge wheel.

Those concerned with these and other problems recognize the need for an improved gauge wheel.

DISCLOSURE OF THE INVENTION

The present invention provides a rim liner member attached to and covering the face of a gauge wheel rim adjacent a soil penetrating disk. The liner member has an exterior surface having a high lubricity which minimizes the build up of wet soil on the exterior surface. The entire liner member may be formed of low-friction polyethylene and it may be configured to conform to the face of the gauge wheel rims used by the manufacturers of planter, grain drills, and other soil working implements.

An object of the present invention is the provision of an improved gauge wheel having an attached low-friction liner.

Another object is to provide a gauge wheel liner that is easy to install on all conventional gauge wheels.

A further object of the invention is the provision of a gauge wheel liner that is simple in design and inexpensive to manufacture.

Still another object is to provide a gauge wheel liner that is durable and requires little maintenance.

A still further object of the present invention is the provision of a gauge wheel liner that improves the operating efficiency of soil working implements by minimizing downtime due to plugged equipment.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
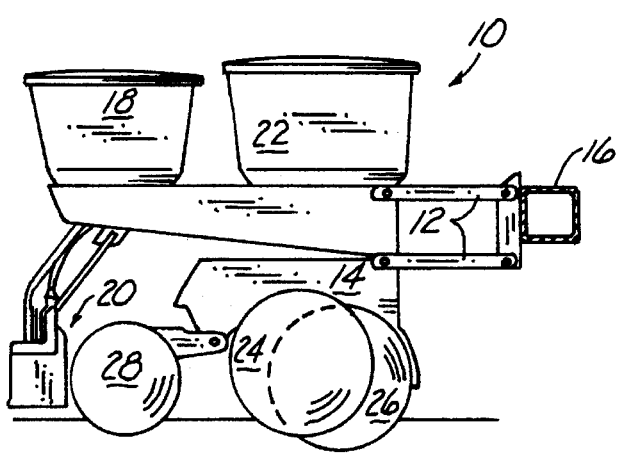
FIG. 1 is a side elevational view illustrating a gauge wheel closely associated with a seed furrow opening disk on a conventional planting unit.

Referring now to the drawings, wherein like reference numerals designate identical or corresponding parts throughout the several views, FIG. 1 shows a planting unit (10) mounted by parallel linkage bars (12) which interconnect the subframe (14) of the planting unit (10) to a main frame (16). The parallel likage bars (12) provide for independent vertical movement of the planting unit (10) with respect to other planting units carried by the main frame (16). The upper portion of the subframe (14) supports a granular chemical hopper (18) including a chemical distributor (20), and a seed hopper (22). The subframe (14) is supported by a pair of adjustable gauge wheels (24) which control the depth of a pair of seed trench forming disks (26). A pair of closing wheels (28) are supported by the subframe (14) rearwardly of the gauge wheel (18).

It is to be understood that other soil working implements, such as grain drills, and implements having a single soil penetrating disk in combination with a depth gauge wheel could also use the gauge wheel rim liner (100) of the present invention.

Figure 2:
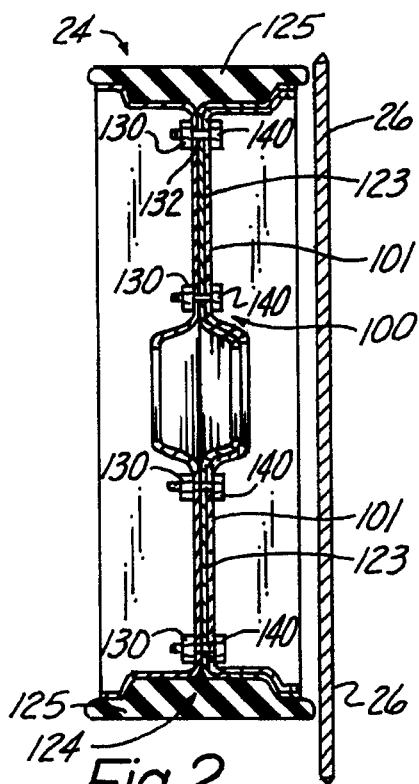
FIG. 2 is a front elevation sectional view illustrating the rim liner of the present invention attached to the face of the gauge wheel rim adjacent the soil penetrating disk.
Figure 3:
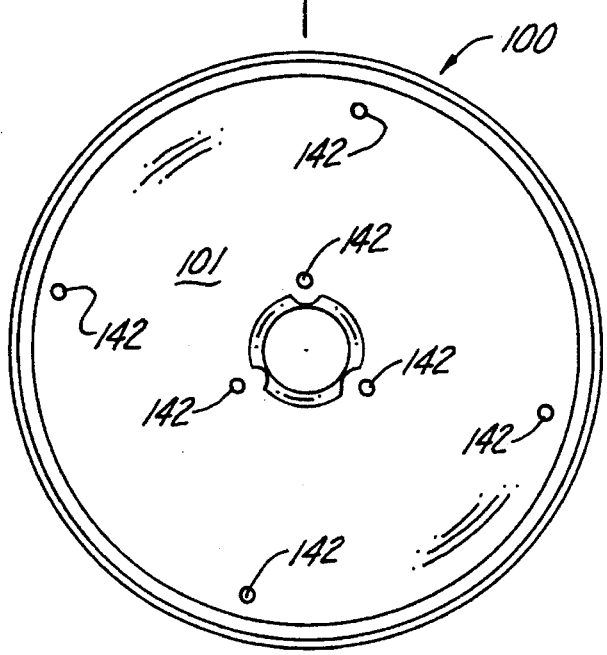
FIG. 3 is a side elevational view of the rim liner.
Figure 4:
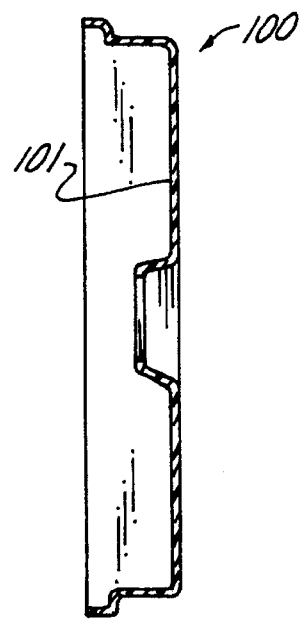
FIG. 4 is a sectional view of the rim liner taken along line 4—4 of FIG. 3.

The rim liner (100) is best shown by reference to FIGS. 2–4. FIG. 2 shows the liner (100) attached to the face (123) of the gauge wheel rim (124) adjacent the soil penetrating disk (26). The disk (26) is positioned to contact the tread (125) of the gauge wheel (24). The liner (100) conforms to the contours of the face (123) and is attached by threaded bolts (130) and nuts (140) extending through registered openings (132 and 142) in the wheel rim (124) and the liner (100). The liner (100) may be formed in various configurations to conform to the various configurations of gauge wheels (24) used by implement manufacturers.

The exterior surface (101) of the liner (100) is formed of material having a high lubricity that resists the accumulation of wet soil. The entire liner (100) may be formed of the same material having low-friction, high lubricity characteristics. One such material is linear low density polyethylene. Another material suitable for use in forming the liner (100) and having high wear resistance is the ultra high molecular weight polyethylene—often referred to as UHMW.

In use the liner (100) is attached to the face (123) of the wheel rim (124) adjacent the disk (26) by bolts (130) and nuts (140). The exterior surface (101) of the liner (100) resists the build up of wet soil due the its low-friction, high lubricity characteristics, and therefore minimizes the down time of the soil working implement.

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

I claim:

1. In a soil working implement including a frame, a soil opening disk attached to the frame, and a depth gauge wheel operably attached to the frame and disposed adjacent the disk to selectively control the depth the disk penetrates the soil, the gauge wheel including a wheel rim having opposed faces including a first face disposed adjacent the disk, the improvement comprising:

a liner member attached to and disposed to cover only the first face of the wheel rim, the liner member having an exterior surface closely conforming to said first face and formed of a material having high lubricity, whereby the buildup of soil on the exterior surface of the liner member adjacent the disk is minimized.

2. The improvement of claim 1 wherein the liner member is configured to be matingly received on and to conform to the first face of the wheel rim.

3. The improvement of claim 2 wherein the liner member includes openings disposed to register with openings in the wheel rim, and wherein the liner member is attached to the wheel rim by fasteners extending through the openings.

4. The improvement of claim 3 wherein the fasteners are threaded bolts and nuts.

5. The improvement of claim 1 wherein the exterior surface of the liner member is formed of polyethylene.

6. The improvement of claim 5 wherein the polyethylene is a linear low density polyethylene.

7. The improvement of claim 5 wherein the polyethylene is ultra high molecular weight polyethylene.

8. The improvement of claim 1 wherein the entire liner member is formed of polyethylene.

9. The improvement of claim 8 wherein the polyethylene is a linear low density polyethylene.

10. The improvement of claim 5 wherein the polyethylene is ultra high molecular weight polyethylene.

11. The improvement of claim 1 wherein the outer periphery of the liner member terminates adjacent the outer periphery of said first face of the rim.

* * * * *